United States Patent
Bryson et al.

(10) Patent No.: US 9,559,512 B1
(45) Date of Patent: Jan. 31, 2017

(54) PROGRAMMABLE RISE TIME CONTROLLED LOAD SWITCH AND INTEGRATED TEMPERATURE SENSOR SYSTEM WITH INTERFACE BUS

(71) Applicant: GLF Integrated Power, Inc., Santa Clara, CA (US)

(72) Inventors: Stephen W. Bryson, Cupertino, CA (US); Ni Sun, Sunnyvale, CA (US)

(73) Assignee: GLF INTEGRATED POWER, INC., Santa Clara, CA (US)

(*) Notice: Subject to any disclaimer, the term of this patent is extended or adjusted under 35 U.S.C. 154(b) by 66 days.

(21) Appl. No.: 14/469,319

(22) Filed: Aug. 26, 2014

Related U.S. Application Data

(60) Provisional application No. 61/871,840, filed on Aug. 29, 2013.

(51) Int. Cl.
*H02H 3/08* (2006.01)
*H02H 1/00* (2006.01)

(52) U.S. Cl.
CPC ............ *H02H 3/08* (2013.01); *H02H 1/0007* (2013.01)

(58) Field of Classification Search
CPC ....................................................... H02H 3/085
USPC ........................................................ 361/101
See application file for complete search history.

(56) References Cited

U.S. PATENT DOCUMENTS

| | | | |
|---|---|---|---|
| 6,476,683 B1* | 11/2002 | Saito ..................... | H02M 3/155 315/291 |
| 7,012,815 B2* | 3/2006 | Garnett .................. | G06F 1/183 361/679.31 |
| 7,940,101 B2 | 5/2011 | Rai et al. | |
| 2002/0130646 A1 | 9/2002 | Zadeh | |
| 2005/0231874 A1* | 10/2005 | Hussein ................ | H02H 9/001 361/93.1 |
| 2011/0194223 A1* | 8/2011 | Kang ..................... | H02H 5/042 361/106 |
| 2011/0291591 A1* | 12/2011 | Shiu .................... | H05B 33/0848 315/297 |
| 2012/0161828 A1 | 6/2012 | Cho | |
| 2013/0154592 A1 | 6/2013 | Teh | |

* cited by examiner

*Primary Examiner* — Scott Bauer
(74) *Attorney, Agent, or Firm* — Pillsbury Winthrop Shaw Pittman LLP

(57) ABSTRACT

A fully integrated circuit configuration that can be used to control the slew rate of a PMOS load switch is described. The circuit also integrates a multichannel temperature sensing system which can be coupled to an external set of temperature sensors, preferably non-linear PTC (positive temperature coefficient) sensors to provide both current inrush control as well as thermal overload protection. A communications data bus, such as an I2C bus, is employed to provide temperature feedback for the system controller so that the system can better control the temperature of its own environment.

12 Claims, 4 Drawing Sheets

025
PROGRAMMABLE RISE TIME CONTROLLED LOAD SWITCH AND INTEGRATED TEMPERATURE SENSOR SYSTEM WITH INTERFACE BUS

RELATED APPLICATIONS

This application is related to U.S. patent application Ser. No. 14/469,258 filed Aug. 26, 2014, and claims the benefit of U.S. Provisional Ser. No. 61/871,840 filed Aug. 29, 2013, both of which are expressly incorporated by reference herein.

FIELD OF THE ART

Described is an integrated circuit that combines current and voltage protection that is afforded by a slew rate controlled load switch with a further level of thermal protection that can make electronic systems both safer and more reliable.

BACKGROUND

Temperature control of modern electronic equipment has always been a concern for anyone designing any system involving electronics. From portable devices to computing systems to automobiles, the operating temperature range of the system is always of concern.

With respect to systems that include an integrated circuit chip, most traditional design schemes involve either integrating a thermal monitor on the chip itself which will protect that chip from damage or, in a system environment, placing a separate temperature sensor somewhere on the PC board. Both of these approaches have limitations. The internal on chip temperature sensor simply responds to the localized heating of the die itself, however, if the temperature problem is being caused by some other device located on the PC board, the on-chip temperature sensor may take too long to respond based upon the board thermal resistance and therefore provide no thermal protection at all. The stand-alone temperature sensor is similarly limited by the thermal resistance on the PC board. The board designer must place the temperature sensor where the designer initially feels is the best location based upon experience in designing systems. However this methodology usually results in having to re-spin the PC board because, after being assembled and tested, the hot spots on the board are usually different from the original assumptions. This can lead to unnecessary expense and delay time in the project development. Furthermore, the hot spots on the PCB can further change when the PCB is enclosed in a system case with a fan and air vents for cooling the system. This can require the PCB to be yet again redesigned for proper placement of the temperature sensor.

SUMMARY

An object described herein is to combine the current and voltage protection that is afforded by a slew rate controlled load switch with a further level of thermal protection that can make electronic systems both safer and more reliable.

The slew rate controlled switch can protect the load side of the switch from excessive inrush current during power turn on and also be able to quickly disconnect the load should it become necessary. This latter feature of the load switch can be enhanced by the addition of the thermal monitoring system.

In one embodiment, the thermal monitoring system preferably utilizes the characteristics of a non-linear positive temperature coefficient ("PTC") sensor to achieve the temperature control feature. These non-linear PTC sensors can be made to have different temperature thresholds depending upon the materials being used to construct the individual sensor. In a preferred embodiment the non-linear PTC sensors will have a fairly low resistance in one temperature region and another significantly greater resistance in another adjacent temperature region, such as 10KΩ changes to 10MΩ, for example. The sensing system utilizes this characteristic by combining the non-linear PTC sensor with the feedback loop of an operational amplifier to produce a dramatic gain change in the operational amplifier when the non-linear PTC sensor transitions from the one temperature region to the adjacent temperature region.

A further object is to place a number of these non-linear PTC sensors in the feedback loop of the operational amplifier such that multiple temperature spots on a PCB can be monitored at the same time, thereby allowing the system designer wider flexibility in placing components on the PCB. In on embodiment, the non-linear PTC sensors are made on a flexible cable that can be directly attached to the surface of the components being monitored so as to remove any dependence on the thermal properties of the PCB.

In yet another embodiment, the temperature sensors could be made to be discrete components that could be linear or non-linear, and which can be surface mounted next to the device being monitored or on the backside of the PCB underneath the location of the device being monitored.

Whether using non-linear PTC sensors or other temperatures sensors, the circuit loop connecting the temperature sensors together could be fabricated into the design of the PCB rather than be added afterwards as an extra cable. Both approaches have merit as well as disadvantages that should be considered in light of the overall goals of the system design.

The design of the non-linear PTC sensors themselves and/or other temperature sensors involves knowing the overall system requirements so that the proper materials are chosen to reflect the desired temperature ranges. Additionally the temperature sensor(s) can have a single temperature to detect or they can have a multi-level response characteristic such that one PTC loop might be configured to respond to two different temperature levels.

Alternately, a multiple channel system can be devised where there can be two or more temperature sensing loops can be set to different temperature threshold thereby allowing the system to have more control over the temperature environment that had been previously available. With a two level system, for example, a lower temperature threshold could be used to provide an indication to the system controller that additional cooling is required in order to maintain the current temperature range. A second higher temperature threshold could also be set such that if the increased cooling done after reaching the lower temperature threshold is not sufficient to maintain the current temperature, the higher threshold could be used to turn off the power to the devices in the temperature monitoring loop using the integrated load switch.

DESCRIPTION OF THE PREFERRED EMBODIMENTS

This application builds on the previously filed provisional application entitled Methods for a Programmable Slew Rate Controlled Load Switch, filed as U.S. Provisional Patent Appl. No. 61/871,840, filed on Aug. 29, 2013, and U.S. patent application Ser. No. 14/469,258 filed on Aug. 26, 2014. That application describes preferred embodiments for controlling a load switch, which embodiments have advantages when used in conjunction with the teachings provided herein, though this application also has aspects that are independently significant, as will become apparent herein. It is noted that the additional temperatures control and data bus circuitry included in the embodiments herein will not consume a significant percentage of the integrated circuit chip real estate, as compare to the other circuit elements, with the load switch being the most significant sized element as described in the provisional already filed and referenced herein.

Figure 1:
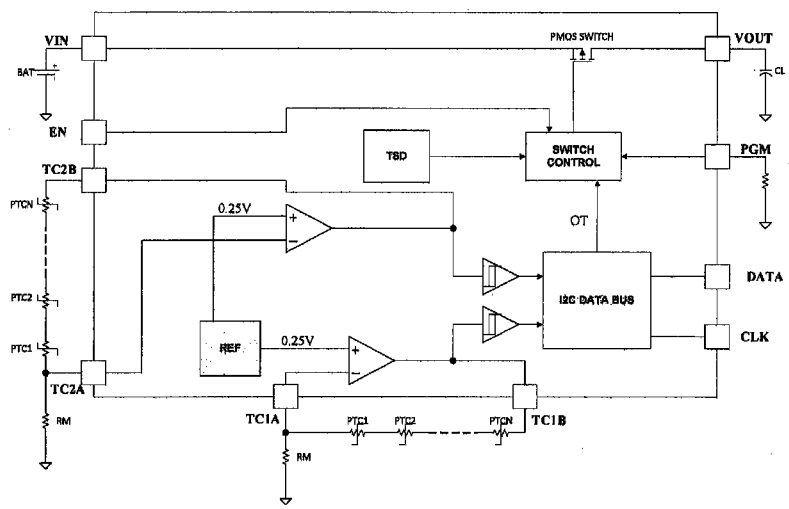
FIG. 1 is an overall block diagram of the power PMOS load switch with slew rate control and integrated temperature sensing system.

FIG. 1 shows the overall block diagram of the integrated circuit load switch with integrated temperature monitoring. For the load switch itself, the function consists of the PMOS power switch which is connected between the VIN pin and the VOUT pin. This load switch is controlled through the EN (enable) input pin and preferably has a user programmable rise time that can be adjusted by adding an external resistor to the PGM input pin as described in U.S. Provisional Patent Appl. No. 61/871,840.

To provide local protection from a potentially catastrophic temperature rise on the chip, a thermal shut down (TSD) circuit is included on the integrated circuit. The TSD cell within the integrated circuit is set to cause the load switch to disconnect the VIN input pin from the VOUT load pin should the die temperature exceed a predetermined temperature threshold, such as 150° C. This protects the load switch from being over stressed due to an output short circuit to ground on the VOUT pin. The TSD cell has built in temperature hysteresis so that if the short at the output is removed, the load switch can be re-enabled when the die temperature returns to a temperature that is below a predetermined different lower temperature threshold, such as 125° C.

Figure 8:
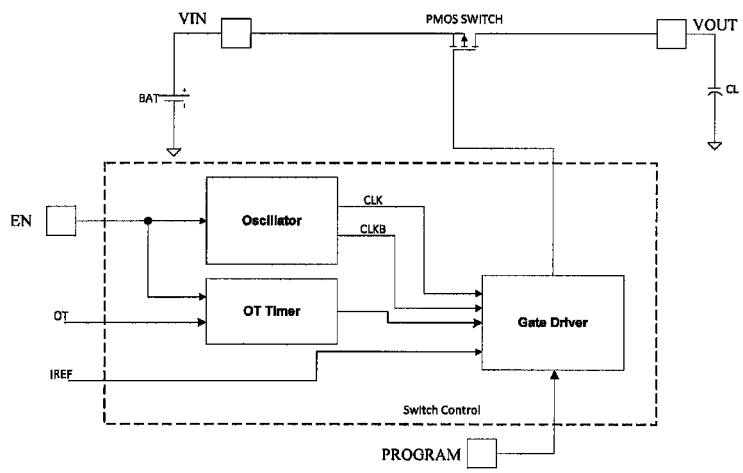
FIG. 8 shows the internal block diagram of the switch control block.

In addition to the slew rate controlled load switch, a temperature monitoring system is added to the integrated circuit for the purpose of providing complete system level control of a PCB through the use of temperature sensors, which temperature sensors can preferably be placed in the feedback loop of an operational amplifier. The temperature monitoring system can also be accessed via a data bus, shown in a preferred embodiment as an I2C data bus with an associated bi-directional I2C data bus controller on-chip, thereby providing for an I/O pad for data, and a separate I/O pad for clock, thus allowing an onboard system controller on the host PCB to be able to have access to the temperature monitoring data so that it can make decisions about how to change the temperature of the ICs on the PCB being monitored. Although the I2C bus is by no means the only data communications bus available, it is widely accepted as a popular interface with which microcontroller systems communicate with peripheral devices. The I2C data communication system consists of two bi-directional lines, one for data, usually named SDA and one for the clock function named SCL. Both lines are open drain lines with external pull up resistors so that any device that is connected to the data line can initiate a data transfer or inquiry. Additionally, the data bus gives the system designer the flexibility to control the load switch over the data bus. For an example suppose the temperature has reached one of the critical threshold values and sent that data to the controller over the data bus (as recognized for example by the temperature detected when a non-linear PTC sensor transitions from the one temperature region to the adjacent temperature region). The controller now knows that if it does not intervene, the load switch will disconnect after a certain period of time. The controller can then issue a command to the load switch to halt its timer (see FIG. 8) over the data bus while it performs some house keeping task that is associated with the load that has tripped the temperature threshold and then wait to query the over temperature register to see if it is still over the temperature threshold. If so, the controller can then release the load switch timer and allow the load switch to disconnect the load.

Figure 2:
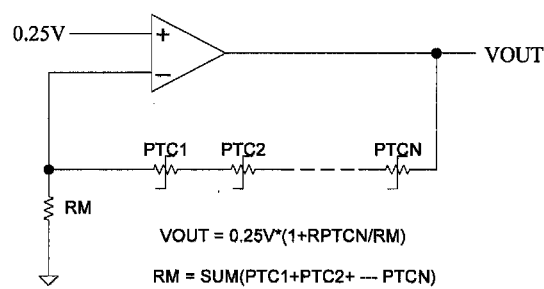
FIG. 2 shows the specific circuit implementation and design equations for the temperature sensing system.

FIG. 2 shows the detail of the operational amplifier temperature monitoring system and the related design equations. An illustrative example shows how this system functions in one aspect, though others are apparent. The operational amplifier's positive input pin is connected to a reference voltage input level that is derived from the on chip reference circuit. For this example, a reference voltage level of 0.25V is used; other reference level voltages are possible depending upon the design criteria of the temperature control system.

Figure 5:
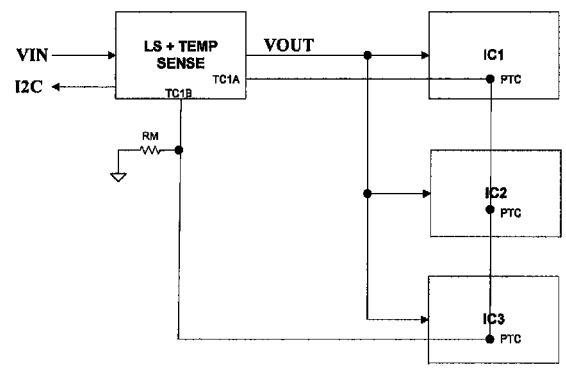
FIG. 5 shows a Load Switch plus Temperature Sensor system controlling 3 different ICs.

FIG. 5 shows an example of the integrated circuit containing the load switch and temperature sensor controlling the supply voltage and current of 3 ICs on the same PCB. Thus, in this example, there are three PTC sensor locations in the amplifier's feedback loop, each sensor located on top of the IC being monitored. Assuming the nominal resistance of the PTC sensor at room temperature is approximately 10KΩ, then the total feedback resistance of the amplifier is 30KΩ. Choosing the matching resistor for the non-inverting feedback configuration of the amplifier; RM=30KΩ, we have an initial voltage at the output of the amplifier at room temperature of:

$$VOUT = VREF*(1+R_{PTC}/R_M) = 0.25V*(1+30\text{ K}/30\text{ K}) = 0.5V \quad (1)$$

It may be desirable to make $R_M$>30 K□ in order to reduce the initial amplifier offset voltage depending upon the supply voltage range being considered. The initial voltage output of the amplifier should preferably be set below the minimum threshold voltage of a logic input gate in order for the logic gate to register that voltage as an input low level.

Another practical variation on the logic level interface is to add a Schmitt trigger buffer between the amplifier output and the logic level input in the system as shown in FIG. 1.

Figure 6:
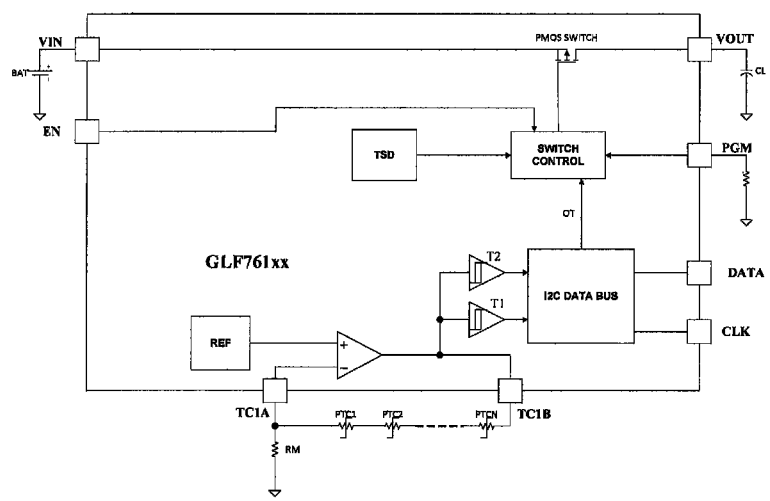
FIG. 6 shows the implementation that would be used for a single channel temperature loop for use with multi-level threshold PTC sensors.

Alternately, one or more comparators could be added to the output of the amplifier for more accurate sensing of the temperature threshold levels shown in FIG. 6.

Figure 3:
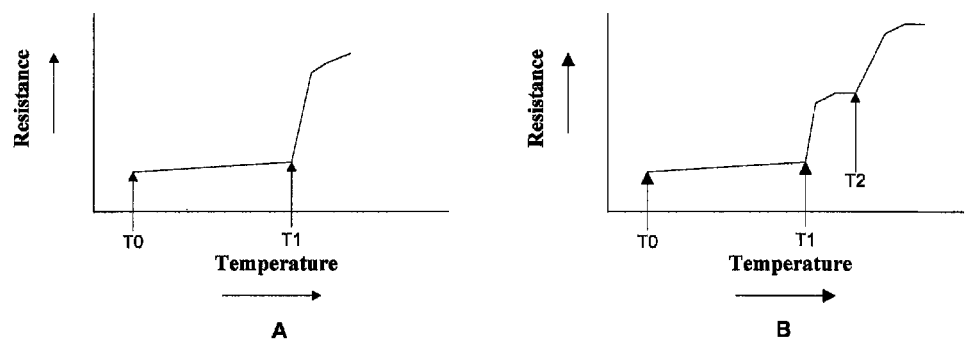
FIG. 3 shows the resistance vs temperature for a typical non-linear PTC device.

As the temperature of the system increases, the operational amplifier output voltage will change with the resistance change of the PTC sensor, however, when the PTC sensor reaches its critical transition point T1 (FIG. 3), the gain of the amplifier loop will change dramatically when the PTC resistor changes from 10KΩ to 10MΩ. This will cause the output voltage of the amplifier to swing positive and register a logic "high" level for the I2C data bus in the preferred embodiment.

Figure 4:
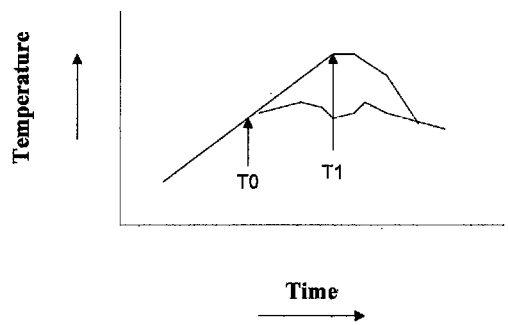
FIG. 4 is the temperature profile of a 2 channel temperature control system.

In the application that involves two such temperature thresholds, one threshold could be set to a lower temperature while a second threshold is set to a higher temperature. This system behavior is illustrated in FIG. 4. As the temperature of the system rises to the first lower temperature threshold (T0), the first PTC loop will indicate to the system controller that a "warning" temperature has been reached and some corrective action is required in order to maintain the temperature below the second higher temperature threshold (T1). If the corrective action is successful, then the temperature will remain in the band between T0 and T1 or may proceed even below the T0 threshold level. Should the corrective action by the system controller be unable to control the temperature rise and the higher threshold of T1 is reached, then the second higher temperature control loop will cause the load switch to open up after a suitable time delay that insures that the temperature stays above the upper threshold and will then remove the power to the monitored ICs thereby forcing the temperature to be reduced by removing the power supply voltage. Once the temperature is restored into the normal operating range, the PTC sensor will return to its nominal resistance value allowing the load switch to attempt to re-connect the output load ICs to the voltage at the input of the switch thereby re-establishing system operation.

Figure 7:
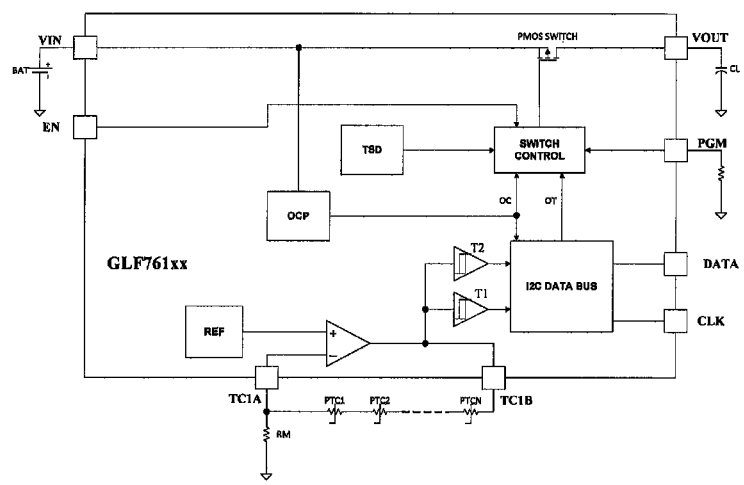
FIG. 7 shows the implementation that would be used to include over current protection (OCP).

As a result of the flexibility and usefulness of the over temperature architecture, the basic preferred embodiment can be further extended by adding additional circuit protection blocks such as the OCP (over current protection) shown in FIG. 7. In this embodiment, the OCP block monitors the current through the main power MOSFET and will indicate to the switch control circuitry when the current through the power MOSFET has exceeded preset limit. The switch controller can process this input along with the OT (over temperature) input and then decide to begin limiting the current through the power MOSFET to the load. In this manner the load switch itself can use the temperature indicator as a monitor to decide whether or not to continue to cut back the current that is being delivered to the load or to take more drastic action. These inputs can also be reported to the system controller via the I2C data communication bus.

Although described herein with reference to the preferred embodiment, one skilled in the art will readily appreciate that other applications may be substituted for those set forth herein without departing from the intended spirit and scope.

The invention claimed is:

1. A switching circuit connectable between an input source voltage and an output load for controlling an inrush current to the output load upon turn-on, the switching circuit including:

an integrated power MOSFET circuit, the integrated circuit including:

a power PMOS load switch including a load switch gate, a load switch source and a load switch drain, the inrush current to the output load passing from the load switch source to the load switch drain and being controlled by a load switch control voltage on the load switch gate; and a variable rise time circuit connected to the gate of the power PMOS load switch that provides the load switch control voltage to the power PMOS load switch after initial turn on and during operation;

a temperature monitoring circuit located external to the integrated circuit, the temperature monitoring circuit including a plurality of connected sensors, and wherein multiple temperature thresholds are sensed, and wherein a highest temperature threshold causes turn-off of the power PMOS load switch; and a resistor external to the integrated circuit and coupled to the variable rise time circuit that allows adjustment of the slew rate of the PMOS load switch.

2. The switching circuit as described in claim 1, wherein the temperature monitoring circuit is integrated into the integrated circuit.

3. The switching circuit as described in claim 2, wherein the integrated temperature monitoring circuit includes an operational amplifier, a reference voltage input, and a logic interface circuit.

4. The switching circuit as described in claim 2, wherein the temperature monitoring circuit includes at least one non-linear external positive temperature coefficient sensor and wherein the resistor is a matching resistor that matches the at least one non-linear external positive temperature coefficient sensor.

5. The switching circuit as described in claim 4, wherein the non-linear external positive temperature coefficient sensor is implemented discretely.

6. The switching circuit as described in claim 4, wherein the non-linear external positive temperature coefficient sensor is implemented as part of a flexible cable assembly.

7. The switching circuit as described in claim 1 further including an interface bus for communicating temperature information obtained from the temperature control circuit to an external system controller.

8. The switching circuit as described in claim 7 further including a thermal shutdown circuit designed to protect said load switch from on-chip die temperatures in excess of 150° C.

9. The switching circuit as described in claim 8 further including an over current protection circuit that acts in conjunction with the over temperature circuit to lower the current through the power PMOS load switch that is being delivered to the load.

10. The switching circuit as described in claim 1, wherein the temperature monitoring circuit includes at least one non-linear external positive temperature coefficient sensor and wherein the resistor is a matching resistor that matches the at least one non-linear external positive temperature coefficient sensor.

11. The switching circuit as described in claim 10, wherein the non-linear external positive temperature coefficient sensor is implemented discretely.

12. The switching circuit as described in claim 10, wherein the non-linear external positive temperature coefficient sensor is implemented as part of a flexible cable assembly.

* * * * *